(12) United States Patent
Harada

(10) Patent No.: US 10,452,900 B2
(45) Date of Patent: Oct. 22, 2019

(54) INFORMATION SHARING SYSTEM, INFORMATION SHARING METHOD, AND RECORDING MEDIUM

(71) Applicant: Shinsuke Harada, Tokyo (JP)

(72) Inventor: Shinsuke Harada, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 31 days.

(21) Appl. No.: 15/596,432

(22) Filed: May 16, 2017

(65) Prior Publication Data
US 2017/0351912 A1   Dec. 7, 2017

(30) Foreign Application Priority Data

Jun. 1, 2016   (JP) .................................. 2016-109887

(51) Int. Cl.
*G06K 9/00*   (2006.01)
*G06F 3/0488*   (2013.01)

(52) U.S. Cl.
CPC ..... *G06K 9/00429* (2013.01); *G06F 3/04883* (2013.01); *G06K 2209/01* (2013.01)

(58) Field of Classification Search
CPC ............ G06K 9/00429; G06K 2209/01; G06F 3/04883
See application file for complete search history.

(56) References Cited

U.S. PATENT DOCUMENTS

| | | | | |
|---|---|---|---|---|
| 6,373,473 | B1* | 4/2002 | Sakaguchi | G06F 17/30259 345/173 |
| 7,260,257 | B2* | 8/2007 | Zhang | G06F 17/30843 382/165 |
| 8,149,227 | B2* | 4/2012 | Marggraff | G06F 3/03545 345/179 |
| 9,142,056 | B1* | 9/2015 | Baran | G06T 15/00 |
| 2002/0009226 | A1* | 1/2002 | Nakao | G06K 9/222 382/177 |
| 2003/0185444 | A1* | 10/2003 | Honda | G06F 3/04883 382/186 |
| 2004/0247205 | A1* | 12/2004 | Nagaya | H04N 5/76 382/305 |
| 2005/0100214 | A1* | 5/2005 | Zhang | G06K 9/222 382/179 |

(Continued)

FOREIGN PATENT DOCUMENTS

JP   2011-090486   5/2011
JP   2015-056855   3/2015

*Primary Examiner* — Ming Y Hon
(74) *Attorney, Agent, or Firm* — Harness, Dickey & Pierce, P.L.C.

(57) ABSTRACT

An information processing system includes circuitry that receives position information of first stroke information and second stroke information drawn on a display at different timing, adds additional information indicating a relationship of the received first stroke information and the received second stroke information to the received first stroke information, and generates, based on the position information of the received first stroke information, the position information of the received second stroke information and the added additional information, consecutive data used for displaying (playing) information drawn on the display as the first stroke information and the second stroke information, and a memory that stores the generated consecutive data.

20 Claims, 7 Drawing Sheets

(56) References Cited

U.S. PATENT DOCUMENTS

| | | | |
|---|---|---|---|
| 2005/0152602 A1* | 7/2005 | Chen | G06K 9/222 |
| | | | 382/187 |
| 2006/0013484 A1* | 1/2006 | Kono | G06K 9/033 |
| | | | 382/181 |
| 2007/0263931 A1* | 11/2007 | Sheets | G06K 9/00436 |
| | | | 382/186 |
| 2009/0003705 A1* | 1/2009 | Zou | G06K 9/00416 |
| | | | 382/187 |
| 2009/0027306 A1* | 1/2009 | Kawabe | G06F 1/162 |
| | | | 345/3.1 |
| 2014/0086489 A1* | 3/2014 | Motoi | G06K 9/00402 |
| | | | 382/187 |
| 2014/0363074 A1* | 12/2014 | Dolfing | G06K 9/00979 |
| | | | 382/156 |
| 2015/0082359 A1 | 3/2015 | Kuba et al. | |
| 2015/0304416 A1* | 10/2015 | Higashi | H04L 67/1095 |
| | | | 709/217 |
| 2016/0092430 A1* | 3/2016 | Motoi | G06K 9/00422 |
| | | | 715/261 |

* cited by examiner

FIG. 4

```
SCENEID: 1  'ID ASSIGNED TO EACH MEETING
  LOGID: 1  'CONSECUTIVE IMAGE ID ASSOCIATED WITH STRING WRITTEN PER UNITS OF TIME
    SUBID: 1  'IMAGE ID FOR PATH OF FIRST CHARACTER
      WRITING TIME: 2016-02-29T10-20-20Z  'DATE/TIME WHEN CHARACTER IS WRITTEN
      SERVERRECEIVEDTIME: 2016-02-29T10-33-20Z  'DATE/TIME WHEN DATA IS STORED

ORDER: 1  'INDICATE ORDER OF BEING WRITTEN
        StartPoint: (4, 2)
        EndPoint: (10, 2)

ORDER: 2
        StartPoint: (7, 2)
        EndPoint: (7, 8)

SUBID: 2  'IMAGE ID FOR PATH OF CHARACTER WRITTEN NEXT
      ORDER: 1  'INDICATE ORDER OF BEING WRITTEN
        StartPoint: (4, 2)
        EndPoint: (10, 2)

ORDER: 2
        StartPoint: (7, 2)
        EndPoint: (7, 8)
           ⋮

LOGID: 2
    SUBID: 1 (IMAGE ID FOR FIRST CHARACTER ASSOCIATED WITH LOGID: 2)
           ⋮
           ⋮
```

INFORMATION SHARING SYSTEM, INFORMATION SHARING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2016-109887, filed on Jun. 1, 2016 in the Japan Patent Office, the entire disclosure of which is hereby incorporated by reference herein.

BACKGROUND

Technical Field

The present invention relates to an information processing system, an information processing method, and a non-transitory recording medium storing an information processing program.

Background Art

Regarding characters and graphics drawn on displays such as electronic information boards (electronic whiteboards) etc., a technology that acquires information as trajectories of coordinates on the display is known. Furthermore, a function that shares the information acquired from the displays with other terminals via networks is also known.

For example, a technology that includes a terminal that transfers display information input by an input device and position specifying information for specifying a position of displaying the display information and a display controller that, in comparison with the received position specifying information and position related information, displays the received display information transferred by the terminal at a position area in the basis of the position information associated with the position related information is known.

SUMMARY

Example embodiments of the present invention provide a novel information processing system that includes circuitry that receives position information of first stroke information and second stroke information drawn on a display at different timing, adds additional information indicating a relationship of the received first stroke information and the received second stroke information to the received first stroke information, and generates, based on the position information of the received first stroke information, the position information of the received second stroke information and the added additional information, consecutive data used for displaying (playing) information drawn on the display as the first stroke information and the second stroke information, and a memory that stores the generated consecutive data.

Further example embodiments of the present invention provide a method of processing information and a non-transitory recording medium storing an information processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 4 is a diagram illustrating a data structure of consecutive data generated in the basis of the position information data acquired in the drawing information sharing system as an embodiment of the present invention;

Figure 1:
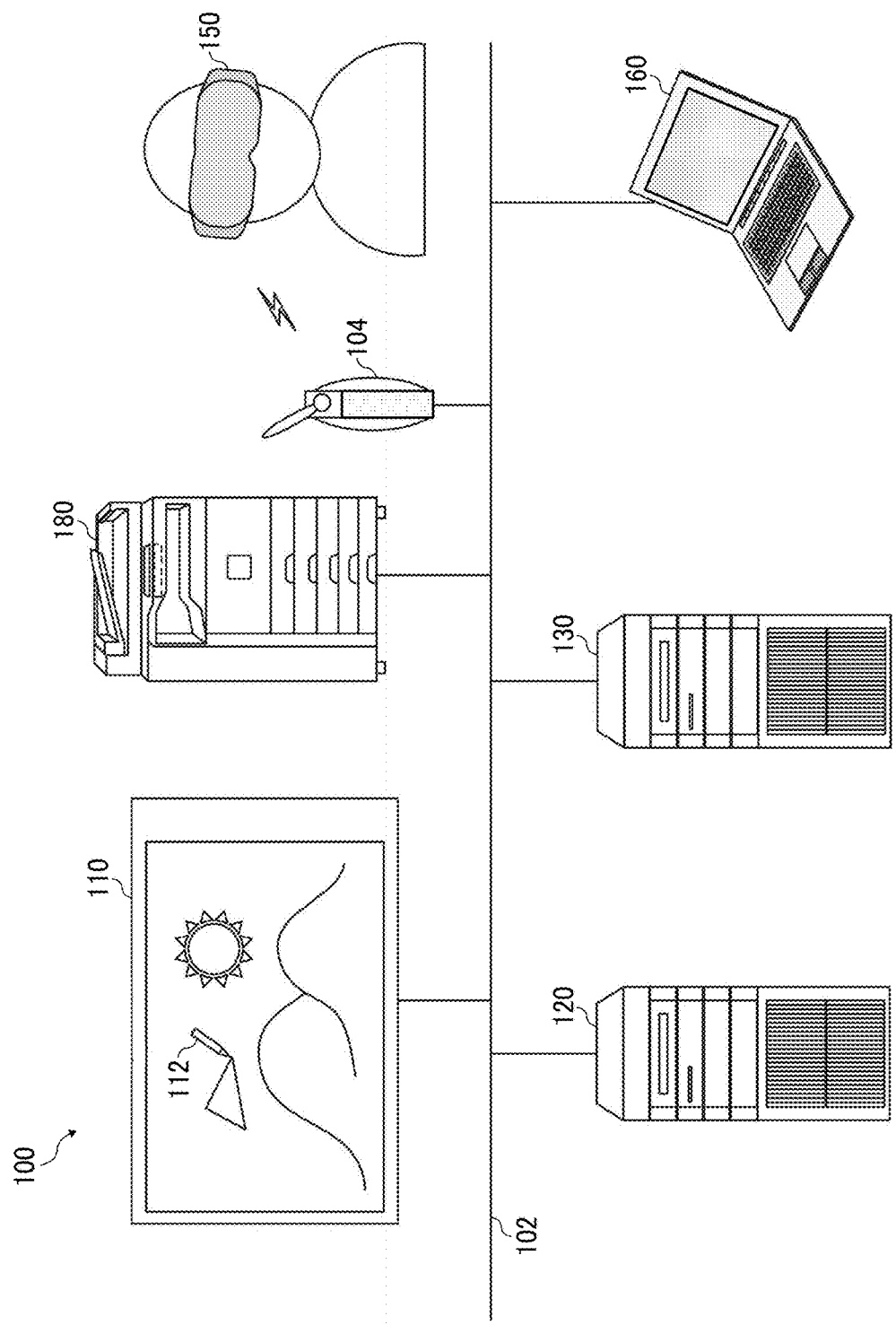
FIG. 1 is a diagram illustrating a drawing information sharing system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context dearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

In the embodiments described below, a drawing information sharing system 100 that shares information drawn on an electronic information board (electronic whiteboard) 110 is described as an example of an information processing system.

FIG. 1 is a diagram illustrating the drawing information sharing system 100 in this embodiment. The drawing information sharing system 100 in FIG. 1 includes the electronic information board 110, a transferring server 120, a managing server 130, a virtual reality display 150, a laptop computer 160, and a multifunction peripheral (NTFP) 180.

The electronic information board 110, the transferring server 120, the managing server 130, the virtual reality display 150, the laptop computer 160, and the MFP 180 are communicably connected with each other via a network 102.

The network 102 includes a wired or wireless local area network (LAN). In FIG. 1, a wireless LAN access point 104 is connected to the network 102. The virtual reality display 150 is connected to the network 102 via the wireless LAN access point 104. However, the network environment illustrated in FIG. 1 is just an example, and it should be noted that the network environment in this embodiment is not particularly limited to the network environment illustrated in FIG. 1. The network 102 may include a public communication network such as the internet etc.

The electronic information board 110 is a device that is also referred to as an interactive whiteboard (IWB). The electronic information board 110 may adopt any one of known methods such as infrared image sensor method, matrix switch method, resistive method, surface acoustic wave method, electromagnetic induction method, and capacitive method etc.

On the electronic information board 110, a user may draw stroke information such as a character and picture etc. on the screen directly using a pointing device such as a stylus 112 and a finger etc. In addition, the electronic information board 110 in this embodiment may provide the stroke information such as the character and graphic drawn on the screen using the pointing device to an external apparatus.

It should be noted that the electronic information board 110 may be provided as a dedicated apparatus that provides an electronic information board function. Otherwise, the electronic information board 110 may be provided as a generic computer such as a tablet computer etc. on which an application that implements an operation of drawing the stroke information such as the character and graphic etc. such as the electronic information board function etc.

The transferring server 120 is a server that reads the drawing information drawn on the screen of the electronic information board 110 from the electronic information board 110 and transfers the read drawing information to the managing server 130. Exemplarily, the transferring server 120 is implemented as a dedicated server that mainly transfers the stroke information drawn on one or more electronic information boards 110 associated with the transferring server 120 itself to the managing server 130 that manages the drawing information in an integrated fashion. However, the configuration of the transferring server 120 is not limited particularly, and the transferring server 120 may be implemented as a server that includes other functions too. In addition, functions of the transferring server 120 may be implemented in other devices such as the electronic information board 110 and the managing server 130 etc.

The managing server 130 is a server that manages information drawn on the electronic information board 110 in an integrated fashion. The managing server 130 in this embodiment may convert the stroke information transferred by the transferring server 120 into consecutive data so that drawing of the information drawn on the electronic information board 110 is playable. Furthermore, in response to a request from an external client terminal, the managing server 130 may distribute the consecutive data for the managed stroke information to the client terminal as the source of the request.

In specific embodiments, the managing server 130 may provide a snapshot of the stroke information drawn on the electronic information board in the basis of the generated consecutive data. Here, the snapshot is information capturing a status of the stroke information drawn on the canvas at a predetermined point in time as a still image.

Exemplarily, the managing server 130 is implemented as a dedicated server that manages the stroke information transferred by transferring server 120 in an integrated fashion. However, the configuration of the managing server 130 is not limited particularly, and the managing server 130 may be implemented as a server that includes other functions too. In addition, functions of the managing server 130 may be implemented in other devices, The virtual reality display 150 illustrated in FIG. 1 is a client terminal that requests the managing server 130 to acquire the consecutive data of the stroke information and plays drawing of the information drawn on the electronic information board 110 in the basis of the acquired consecutive data on the display of the virtual reality display 150 itself. The virtual reality display 150 is implemented as a head mount display or a smart glass etc. The laptop computer 160 is also a similar client terminal. The virtual reality display 150 and the laptop computer 160 are examples of the client terminal, and mobile information devices such as a smartphone and a tablet computer etc. and a generic computer such as a desktop computer etc. may be used as the client terminal. Furthermore, the client terminals 150 and 160 in this embodiment may acquire the snapshot of the stroke information from the managing server 130 and request the MFP 180 to print the snapshot.

The MEP 180 is an image forming apparatus that performs an operation of forming an image in response to a request to print out the image. In the embodiment illustrated in FIG. 1, the client terminals 150 and 160 may request the MFP 180 to print out the snapshot acquired from the managing server 130. The MFP 180 may print out the snapshot of the stroke information passed as print data as the still image in response to the request to print out the image from the client terminals 150 and 160.

Figure 2:
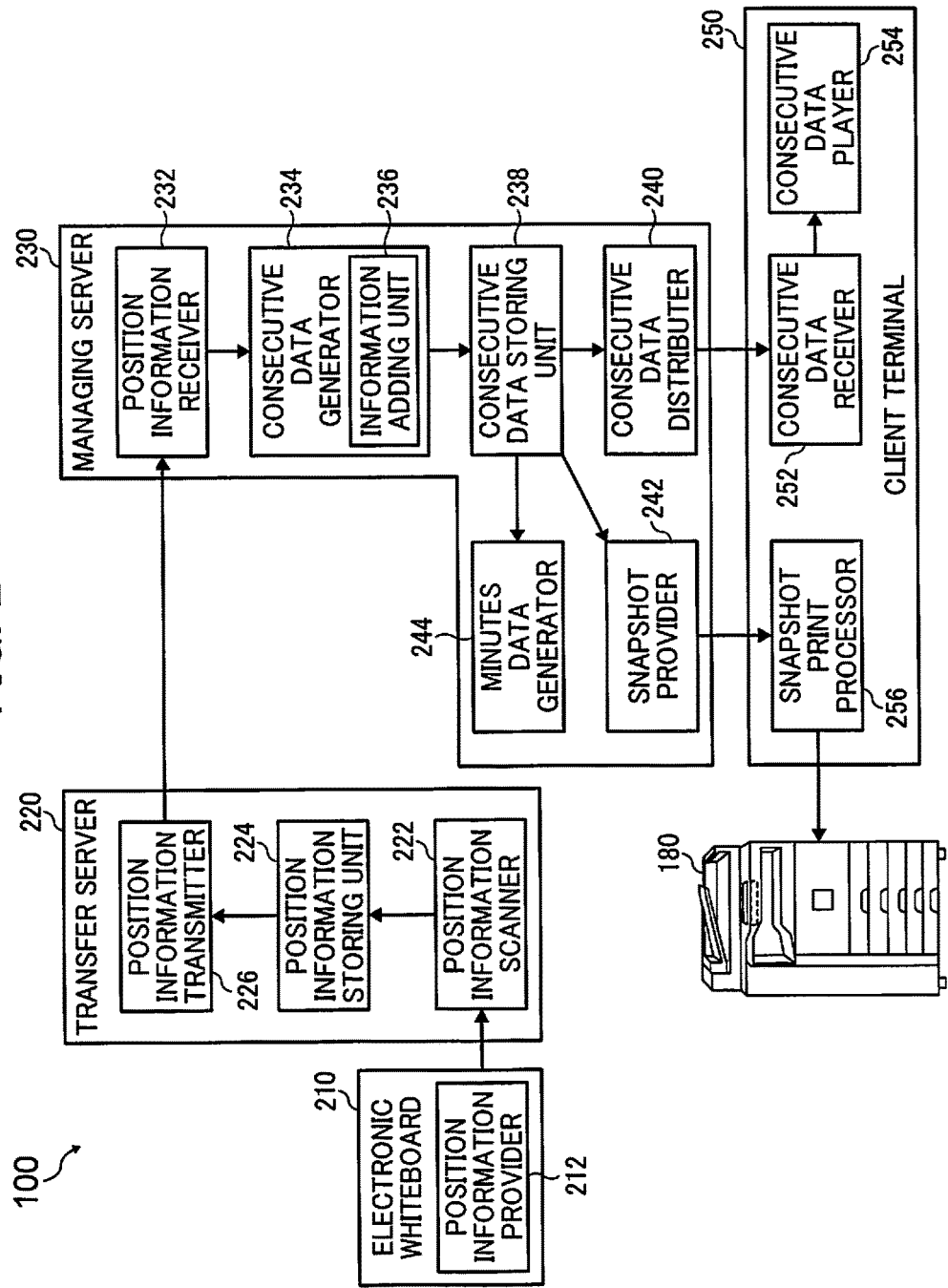
FIG. 2 is a block diagram illustrating functions of the drawing information sharing system as an embodiment of the present invention.

FIG. 2 is a block diagram illustrating functions of the drawing information sharing system 100 in this embodiment. In FIG. 2, a function block 210 in the electronic information board 110, a function block 220 in the transferring server 120, a function block 230 in the managing server 130, and a function block 250 in the client terminal 150 (hereinafter referred to as the virtual reality display 150 representatively).

In the function block 210 in the electronic information board 110, a position information provider 212 is included. After the stroke information such as the character and graphic etc. on the screen of the electronic information board 110 using the pointing device such as the stylus 112 etc. is drawn by user operation, the electronic information board 110 calculates coordinates of the position pointed by the pointing device such as the stylus 112 etc., generates display data by drawing a line in the basis of a trajectory of the calculated coordinates, and displays the generated display data on the screen of the electronic information board 110. As a result, user experience as if the stroke information is handwritten on the canvas may be provided. The position information provider 212 may provide the position information data indicating the trajectory of the stroke information such as the character and graphic drawn on the screen to the external apparatus, In the function block 220 in the transferring server 120, a position information reader 222, a position information storing unit 224, and a position information transferring unit 226 are included.

The position information reader 222 reads position information data indicating the trajectory of the stroke information drawn on the screen from the position information provider 212 in the electronic information board 110 and stores the read position information data in the position information storing unit 224. The position information storing unit 224 stores the position information data of the stroke information read from the electronic information board 110 temporarily, A timing of reading the position information data is not particularly limited. For example, the position information reader 222 may read the position information data for one stroke each time one stroke (corresponding to one stroke in the case of characters) is drawn. Otherwise, for example, the position information reader 222 may read the position information data for one character each time one character is drawn and read the position information data for multiple characters each time multiple characters are drawn using a timing that the drawing operation is not performed for a predetermined period of time after holding up the pen as a separator.

The position information transferring unit 226 transfers the position information data of the stroke information stored in the position information storing unit 224 to the managing server 130 at a predetermined interval. It is assumed that the managing server 130 as a transferring destination is preregistered. The predetermined interval for transferring the position information may be either regularly or irregularly. In this embodiment, it is assumed that the position information transferring unit 226 transfers the position information of the stroke information to the managing server 130 at a constant interval. However, the predetermined interval for transferring the position information is not particularly limited. In other embodiments, the position information transferring unit 226 may transfer the position information data for one stroke, one character, or multiple characters to the managing server 130 immediately each time the position information for one stroke, one character, or multiple characters is read. After detecting that the sequential drawing is finished, the transferring server 120 reports to the managing server 130 that the drawing is finished. For example, in response that drawing is not performed for a predetermined period of time, it is reported to the managing server 130 that drawing is finished.

Figure 3:
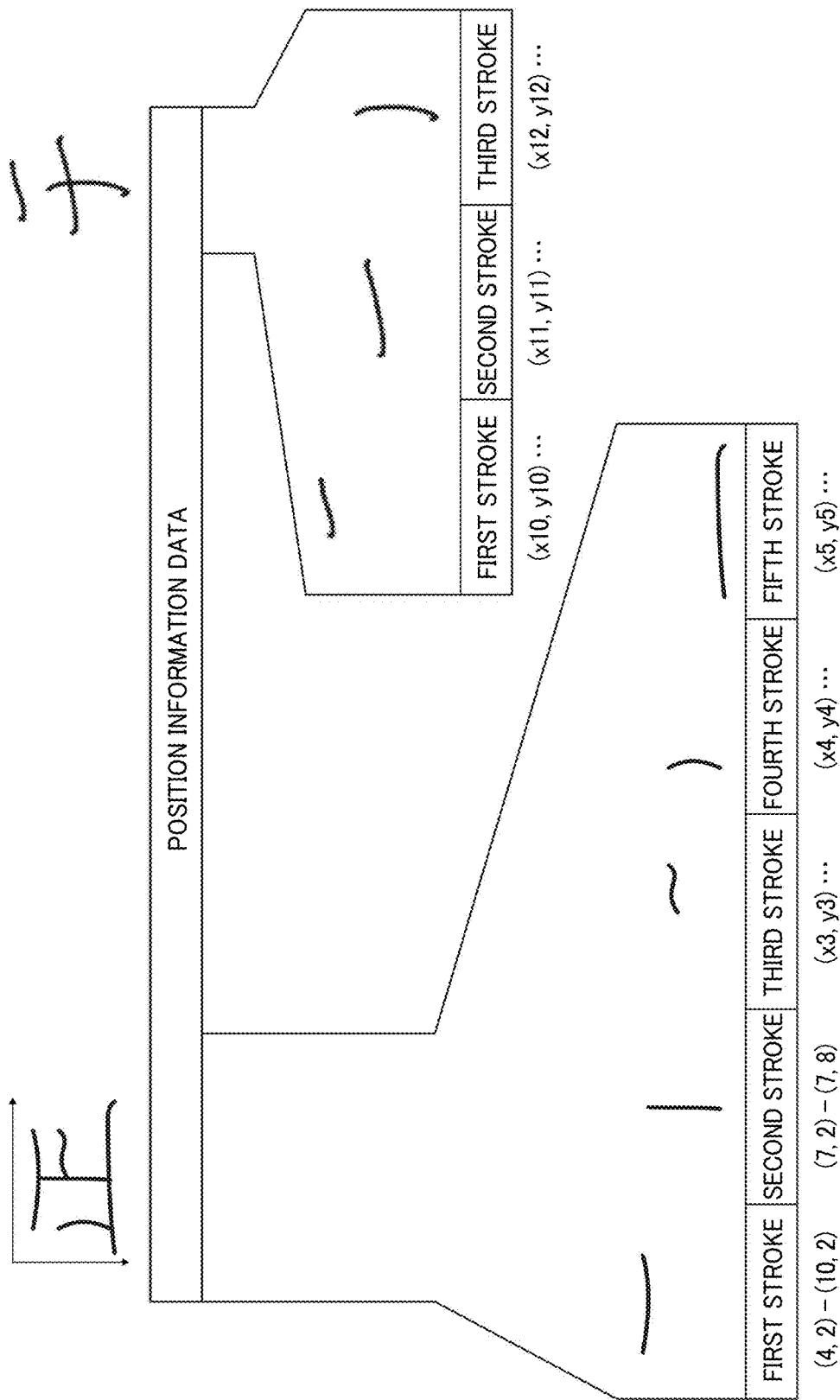
FIG. 3 is a diagram illustrating position information data acquired from an electronic information board in the drawing information sharing system as an embodiment of the present invention.

Here, with reference to FIG. 3, the position information data of the stroke information is described below. FIG. 3 is a diagram illustrating the position information data acquired from the electronic information board 110 in the drawing information sharing system 100 in this embodiment.

As illustrated in FIG. 3, the position information data read from the electronic information board 110 and transferred by the transferring server 120 includes one or more strokes (corresponding to one stroke in the case of characters) drawn on the screen of the electronic information board 110. Each stroke includes coordinates information of the trajectory on the predetermined canvas on the electronic information board 110. Exemplarily, coordinates are expressed using a coordination system illustrated in FIG. 3. More specifically, the upper left is considered as the origin (0, 0), and values increase as a point moves to the lower side and the right side.

As illustrated in FIG. 3, the position information data includes one or more strokes, and characters and graphics include one or more strokes. For example, as illustrated in FIG. 3, a kanji character (left side) consists of five strokes. Likewise, as illustrated in FIG. 3, a katakana character (right side) consists of three strokes. In FIG. 3, in consideration of simplifying descriptions, only the start point and end point are illustrated. However, one or more intermediate points indicating the middle of the stroke may be included. It should be noted that the number of strokes included in one position information data transferred to the managing server 130 depends on the timing of transferring as described above.

The position information data may include an array of one of more strokes. Furthermore, the array of one or more strokes may be divided by strokes in units of a character by performing handwriting recognition. Furthermore, in addition to the coordinates information, each stroke may include other attribute values such as the weight and color of the pen used for drawing the character and graphic, motion information such as speed of a tip of the pen, and information on pen pressure etc.

Here, FIG. 2 is referred to again. The function block 230 in the managing server 130 includes a position information receiver 232, a consecutive data generator 234, a consecutive data storing unit 238, and a consecutive data distributor 240.

The position information receiver 232 receives the position information data of the stroke information drawn on the electronic information board 110 from the position information transferring unit 226 in the transferring server 120. A receiver in this embodiment consists of the position information receiver 232. The predetermined interval corresponds to an interval when the transferring server 120 described above performs the transferring operation.

In the basis of the received position information data, the consecutive data generator 234 generates consecutive data for playing drawing the information drawn on the electronic information board described above. More specifically, the consecutive data generator 234 includes an information adding unit 236. The information adding unit 236 adds additional information indicating a relationship with other stroke information to the stroke information. The consecutive data storing unit 238 stores the consecutive data generated by the consecutive data generator 234 and keeps the consecutive data in preparation for distributing the consecutive data later.

FIG. 4 is a diagram illustrating a data structure of the consecutive data generated in the basis of the position information data acquired in the drawing information sharing system 100 in this embodiment. As illustrated in FIG. 4, in the generated consecutive data, the position information of the stroke information (such as StartPoint and End Point etc. for example) is recorded in addition to the additional information associated with the position information.

Examples of the added additional information are SCENEID as scene identification information associated with stroke information that constructs the same scene, LOGID as consecutive image identification information associated with stroke information belonging to a group of objects drawn within the same range of a period of time, SUBID as image identification information associated with stroke information belonging to the same object that constructs the group of objects, and ORDER as order information specifying an order with other stroke information in the object. Here, an example of the scene is a meeting etc. The object may include a character and graphic. In the below description, it is assumed that the object is a character for the sake of convenience.

The consecutive data generator 234 records the position information of the stroke information in the generated consecutive data and records the scene identification information SCENEID, the consecutive image identification information LOGID, the image identification information SUBID, and the order information ORDER described above associated with the position information. The information adding unit 236 constructs an information adding unit in this embodiment, and the consecutive data generator 234 constructs a generator in this embodiment.

Here, FIG. 2 is referred to again. In response to a request from the client terminal, the consecutive data distributor 240 distributes the consecutive data stored in the consecutive data storing unit 238 to the client terminal 150. For example, the user may receive the consecutive data specifying an intended scene using the scene identification information SCENEID etc. In addition, the user may receive the consecutive data specifying an intended period of time using the consecutive image identification information LOGID etc. The consecutive data distributor 240 constructs a distributor in this embodiment. Otherwise, the user may receive the consecutive data from the top specifying the consecutive data currently being generated.

Furthermore, the function block 230 in the managing server 130 may also include a snapshot provider 242 and a minutes data generator 244.

The snapshot provider 242 generates a snapshot in the basis of the consecutive data stored in the consecutive data storing unit 238 and provides the generated snapshot to the client terminal 150 as the origin of the request. For example, the user may acquire the snapshot specifying a point of time using the scene identification information SCENEID and the consecutive image identification information LOGID etc. described above. The snapshot provider 242 constructs a provider in this embodiment.

The minutes data generator 244 performs character recognition in the basis of the consecutive data stored in the consecutive data storing unit 238, generates minutes data including one or more recognized characters, and provides the requested consecutive data to the client terminal. For example, the user may acquire the minutes data specifying a scene using the scene identification information SCENEID etc. described above. The minutes data generator 244 constructs a minutes generator in this embodiment.

By applying the character recognition technology, the minutes data generator 244 may recognize the drawn character based on the consecutive data described above. The character recognition method is not limited specifically. For example, if attribute information such as motion of the tip of the pen in a stroke and holding up/down the pen etc. may be acquired, it is possible to apply an online handwritten character recognition technology that performs a pattern matching operation with a character database on one or more stroke data in accordance with the recognition algorithm and estimates the drawn character, :In that case, connectivity between characters may be considered by preforming the recognizing operation in units of multiple characters and using dictionary for words etc. In other embodiments, it is possible to perform an imaging operation in the basis of the trajectory of coordinates and recognize characters by applying an offline character recognition technology.

The function block 250 in the client terminal 150 includes a consecutive data receiver 252, a consecutive data player 254, and a snapshot print processor 256.

The consecutive data receiver 252 requests the managing server 130 to distribute the consecutive data and receives the consecutive data distributed by the consecutive data distributor 240 in the managing server 130. Intentional consecutive data may be specified using the scene identification information SCENEID and the consecutive image identification information LOGID etc. Otherwise, consecutive data being generated may be distributed.

In the basis of the consecutive data received by the consecutive data receiver 252, the consecutive data player 254 draws a stroke on the display screen and displays playing information drawn on the electronic information board 110 on a flat display included in the virtual reality display 150 or the client terminal 160.

The snapshot print processor 256 requests the managing server 130 to provide the snapshot and publishes a print job to the external NEP 180 etc. in the basis of the snapshot data provided by the snapshot provider 242 in the managing server 130. The snapshot at an intentional point in time may be specified using the scene identification information SCENEID and the consecutive image identification information LOGID etc. Otherwise, the snapshot at the present point in time may be provided.

In this embodiment, for example, the acquired snapshot is used for printing out. However, the way of using the snapshot is not limited, and snapshots at one or more points in time respectively may be generated as an image file for one page such as Joint Photographic Experts Group (JPEG), Bitmap (BMP), Graphics Interchange Format (GIF), and Portable Network Graphics (PNG) etc. or an image file for multiple pages such as Tagged image File Format (TIFF) and Portable Document Format (PDF) etc., transferred to a predetermined mail address, and stored in a network sharing folder.

Figure 5:
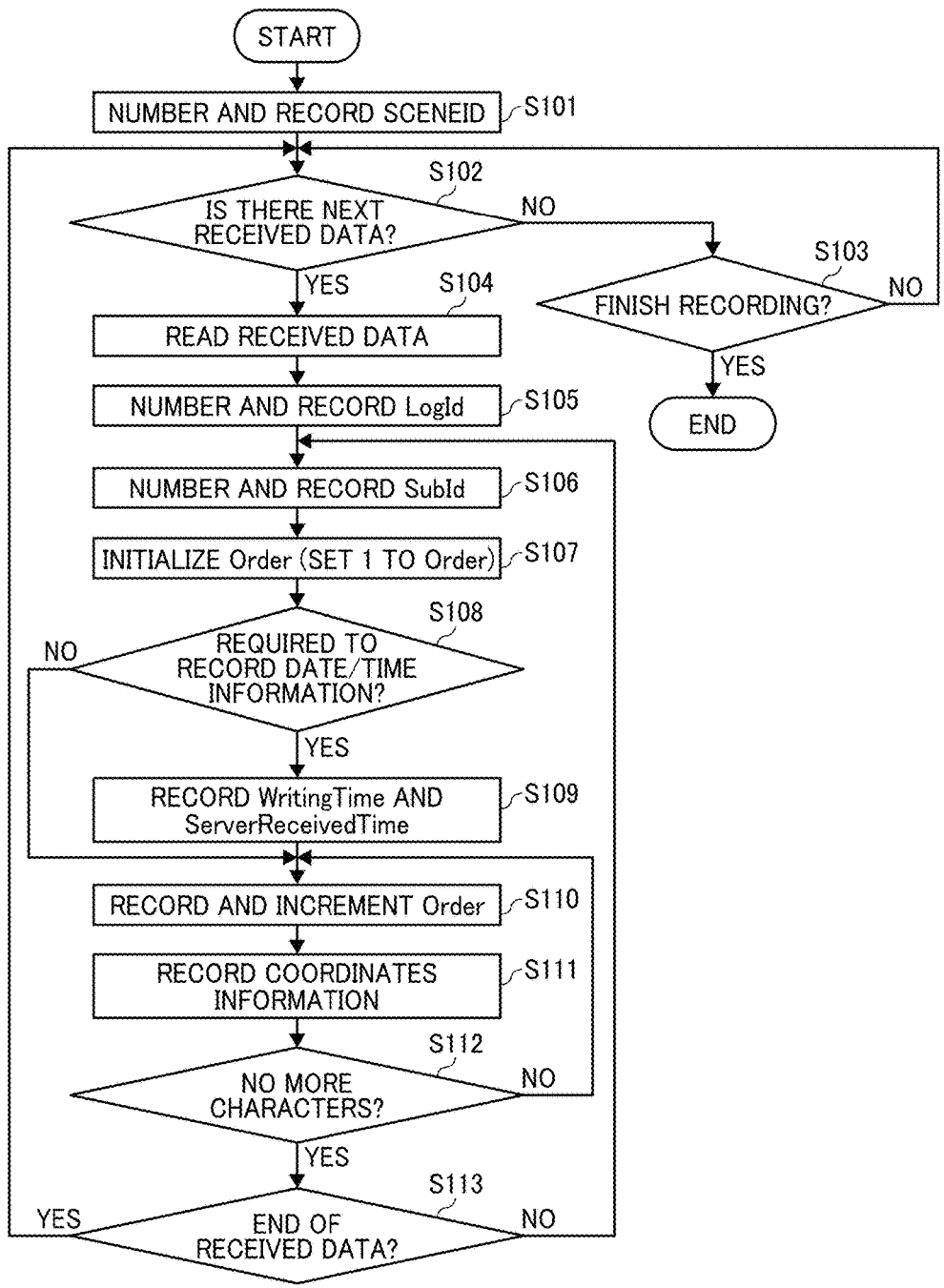
FIG. 5 is a flowchart illustrating an operation of generating consecutive data performed by a managing server included in the drawing information sharing system as an embodiment of the present invention.

With reference to FIG. 5, an operation of generating consecutive data performed by the managing server 130 is described below in further detail. FIG. 5 is a flowchart illustrating an operation of generating consecutive data performed by the managing server 130 included in the drawing information sharing system 100 in this embodiment.

For example, when a predetermined meeting starts, the operation illustrated in FIG. 5 starts in response to a command to start recording the meeting by user operation. In 51.01, the managing server 130 numbers the scene identification information SCENEID for each meeting and record the numbered scene identification information SCENEID in the consecutive data. Stroke information acquired from now on is associated with the numbered scene identification information SCENEID until it is finished to record the meeting. As a result, the position information data sporadically transferred by the transferring server 120 to the managing server 130 may be collectively managed, and association with other stroke information constructing the same scene is recorded regarding the stroke information.

In S102, the managing server 130 determines whether or not next received data exists. Here, the position information data is assumed to be put in a queue in the order of being received by the position information receiver 232. If the position information data is not received, it is determined that the next received data does not exist yet. In S102, if it is determined that the next received data is not received yet (NO in S102), the step proceeds to S103. In S103, the managing server 130 determines whether or not it is commanded to finish recording the meeting by user operation. In S103, if it is determined that it is not commanded to finish recording the meeting by user operation (NO in S103), the step proceeds to S102. As a result, it is waited to receive the position information data transferred by the transferring server 120 until it is commanded to finish recording the meeting, By contrast, in S102, if it is determined that the next received data exists (YES in S102), the step proceeds to S104. If one or more position information data is put in the queue, it is determined that the next received data exists. In S104, the managing server 130 reads the position information data located at the top of the queue as the next received data.

In S105, the managing server 130 numbers the consecutive image identification information LOGID and record the numbered consecutive image identification information LOGID in the consecutive data. Stroke information acquired from now on is associated with the numbered consecutive image identification information LOGID until the next received data is processed. In this embodiment, the consecutive image identification information LOGID is numbered in units of the position information data received by the position information receiver 232. As a result, association with other stroke information belonging to a string drawn within the same predetermined time frame is recorded regarding the stroke information.

In S106, the managing server 130 numbers the image identification information SUBID and record the numbered image identification information SUBID in the consecutive data. The image identification information SUBID is an image ID assigned to each character. Stroke information acquired from now on is associated with the numbered image identification information SUBID until the next character is processed. As a result, association with other stroke information belonging to the same character constructing a string drawn within the same time frame is recorded regarding the stroke information. In this embodiment, for the sake of convenience, it is assumed that the position information data is received in units of at least one or more characters and strokes for one character is not divided into multiple position information data.

In S107, the managing server 130 initializes order information ORDER that stores the order of stroke information in the character. Here, it is assumed that the order information is initialized as "1" indicating the first stroke information.

In S108, the managing server 130 determines whether or not it is required to record time information. For example, the time information is measured at the timing of receiving the position information data normally. In this case, if the time information added to the position information data may be acquired such as the first operation after numbering the consecutive image identification information LOUD, it is determined that it is required to record the time information.

If it is determined that it is required to record the time information (YES in S108), the step proceeds to S109. In S109, the managing server 130 records the time information in the consecutive data. Here, writing time (WritingTime) and received time (ServerReceivedTime) illustrated in FIG. 4 correspond to the time information. Here, the writing time (WritingTime) indicates approximate date/time when the drawing operation is performed on the electronic information board 110. The received time (ServerReceivedTime) indicates date/time when the data is transferred to the managing server 130.

In S110, the managing server 130 acquires the order information ORDER numbered at that moment, records the acquired order information ORDER in the consecutive data, and increments the order information ORDER by 1. As a result, the order with other stroke information belonging to the same character regarding the stroke information is recorded.

In S111, the managing server 130 reads information on stroke to be processed in the received data and records the coordinates information of the read stroke. It should be noted that the stroke is constructed including a start point (StartPoint) and an end point (EndPoint). However, as described above, the construction of the stroke is not limited, and one or more intermediate points may be included, and the attribute information described above may also be recorded in addition to the coordinates information.

In S112, the managing server 130 determines whether or not it is an end position of the character with reference to the stroke to be processed. If a delimiter of characters is included in the position information data, it is possible to determine whether or not it is the end in the basis of the delimiter. If the delimiter of characters is not included in the position information data, an appropriate delimiter is determined accordingly by performing the character recognition operation. In S112, if it is determined that it is not the end position of the character (NO in S112), the step goes back to S110, and the operation is performed on the next stroke. By contrast, in S112, if it is determined that it is the end position of the character (YES in S112), the step proceeds to S113.

In S113, the managing server 130 determines whether or not it is an end of the read received data. If it is determined that it is not the end of the read received data (NO in S113), the step goes back to 5106, and the next character in the received data is to be processed. By contrast, if it is finished to record the last stroke in the received data and it is determined that it is the end of the received data (YES in S113), the step goes back to S102, and the next received data is to be processed.

With reference to S103 again, in S103, if it is commanded to finish the meeting by user operation and it is determined to finish recording the meeting (YES in S103), the operation ends.

By performing the consecutive data generating operation illustrated in FIG. 5, one or more position information data received sporadically illustrated in FIG. 3 is converted into the consecutive data in units of scene that the information on date/time and the order is added illustrated in FIG. 4 to be managed by the drawing information sharing system 100 in this embodiment.

Figure 6:
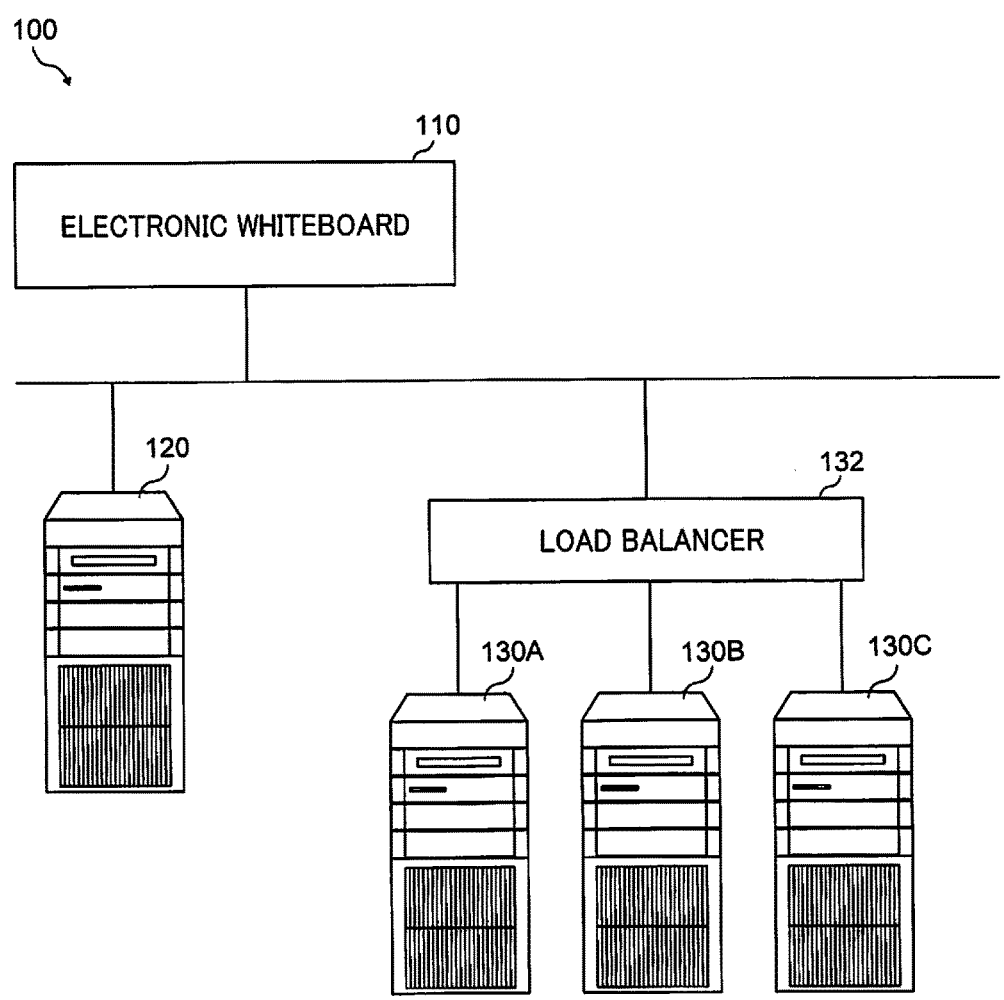
FIG. 6 is a diagram illustrating a layout of a transferring server and the managing server in the drawing information sharing system as an embodiment of the present invention.

FIG. 6 is a diagram illustrating a specific layout of the transferring server 120 and the managing server 130 in the drawing information sharing system 100 in this embodiment. In the drawing information sharing system 100 illustrated in FIG. 6, multiple managing servers 130 are included, and a load balancer 132 is laid out between the multiple managing servers 130A, 130B, and 130C and the network 102.

The load balancer 132 distributes the operation of generating the consecutive data described above to one or more managing servers 130A to 130C. The load balancer 132 constructs a load distributor in this embodiment.

Figure 7:
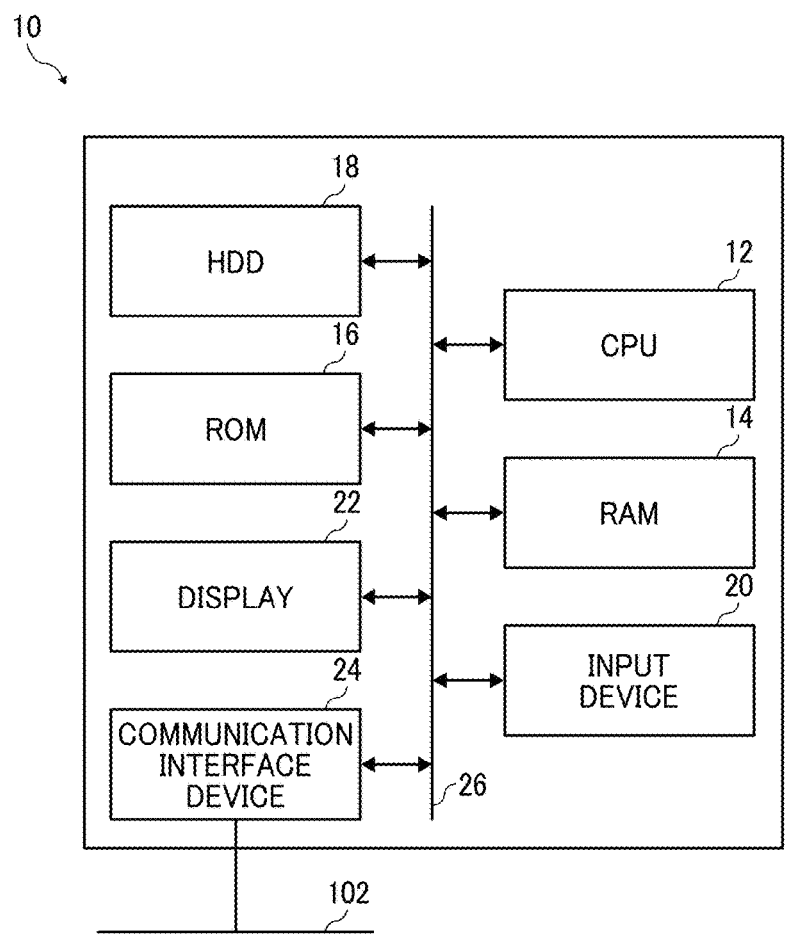
FIG. 7 is a diagram illustrating a hardware configuration of the transferring server and the managing server in the drawing information sharing system as an embodiment of the present invention.

The transferring server 120 in FIG. 7 acquires the position information on the stroke information drawn on the electronic information board 110 from the electronic information board 110 and transfers the position information on the stroke information to the load balancer 132. In accordance with a predetermined method such as round robin etc., the load balancer 132 determines a destination of the distribution among one or more managing server 130A to 130C and further transfers the position information of the stroke information.

By adopting the configuration of distributing load illustrated in FIG. 6, even if many electronic information board 110 exist, it is possible to reduce load weighed on one managing server 130.

The hardware configuration of the transferring server 120 and the managing server 130 is described below with reference to FIG. 7. FIG. 7 is a diagram illustrating a hardware configuration of the transferring server 120 and the managing server 130 in the drawing information sharing system 100 in this embodiment.

The transferring server 120 and the managing server 130 in this embodiment are implemented as a generic computer 10 etc. The generic computer 10 illustrated in FIG. 7 includes a single-core or multi-core central processing unit (CPU) 12, a random access memory (RAM) 14, a read only memory (ROM) 16, a hard disk drive (HDD) 18, and a communication interface (I/F) device 24. The generic computer 10 may include an input device 20 and a display 22 if necessary.

The CPU 12 controls the entire generic computer 10 such as performing internal operations etc. The RAMI 14 provides a working area for the CPU 12. The ROM 16 stores a control program such as Basic Input/Output System (BIOS) etc. The HDD 18 stores an operating system (OS) for controlling the generic computer 10, a control program for implementing functional units (described later), various system information, and various configuration information, The input device 20 is an input device such as a mouse, a keyboard, and a touch screen panel etc. The display 22 is a display device such as a liquid crystal display, and an organic electroluminescence (EL) display etc. The input device 20 and the display 22 construct a user interface for accepting input for various instructions by user operation. The communication I/F device 24 is an interface device such as a network interface card (NIC) that connects the generic computer 10 to the network 102.

The generic computer 10 in this embodiment implements the functional units and operations described above as the transferring server 120 and the managing server 130 under control of the CPU 12 by reading programs from the ROM 16 and the HDD 18 and expanding the read programs into the working area provided by the RAM 14.

As described above, in the embodiments described above, the information processing system that may manage the information drawn on the display device as the consecutive data that may play information drawn on the display device is provided.

Especially, in the embodiments described above, the information drawn on the display device such as the electronic information board 110 etc. is managed by the managing server 130 as the consecutive data that may play drawing information. As a result, it is possible to share the information efficiently. For example, information may be shared by using the virtual reality display 150, and it is possible to construct environment as if a user joins the meeting in real time instead of attending the meeting actually by using the virtual reality display 150.

In the embodiments described above, the information drawn on the electronic information board 110 is managed as the consecutive data. Therefore, the consecutive data may be played back afterwards so that the information is drawn in the order of being written. As a result, the user may share virtual experience as if the user attends the meeting and see the information being drawn.

In the above-described example embodiment, a computer can be used with a computer-readable program, described by object-oriented programming languages such as C++, C#, Java (registered trademark), or legacy programming languages such as machine language, assembler language, C language to control functional units used for the apparatus or system. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), Blu-ray disc, electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

In the embodiments described above, the information processing system that may manage the information drawn on the display as the consecutive data that the information drawn on the display may be played back is provided.

In the above-described example embodiment, a computer can be used with a computer-readable program, described by object-oriented programming languages such as C++, Java®, JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system, comprising:
a first display;
a transfer server;
a managing server; and a second display;
wherein the transfer server includes circuitry configured to:
receive, from the first display, position information of first stroke information and second stroke information drawn on a first display at different timing;
wherein the managing server includes circuitry configured to receive, from the transfer server, the received position information of the first stroke information and the second stroke information drawn on the first display and add additional information indicating a relationship of the received first stroke information and the received second stroke information to the received first stroke information;
generate, based on the position information of the received first stroke information, the position information of the received second stroke information and the added additional information, consecutive data used for identifying a time of the creation of the first stroke information and the second stroke information and displaying information drawn on the first display as the first stroke information and the second stroke information; and
store the generated consecutive data in a memory,
wherein the second display includes circuitry configured to retrieve the stored consecutive data from the managing server and recreate drawing of strokes that were originally created on the first display on a display screen of the second display and display the position information and the additional information on the second display based on the consecutive data.

2. The information processing system according to claim 1,
wherein the first stroke information and the second stroke information respectively indicates a first stroke and a second stroke drawn on the first display, and
the position information of the first stroke information and the second stroke information includes coordinates information indicating a trajectory of the first stroke and the second stroke on the first display.

3. The information processing system according to claim 1,
wherein the managing server circuitry further:
sets order information specifying an order of the first stroke information and the second stroke information as the additional information; and
includes the order information in the generated consecutive data by associating the order information with the position information.

4. The information processing system according to claim 1,
wherein when a group of objects is drawn during a given one time length, each of the objects is drawn with a plurality of stroke information,
the managing server circuitry:
sets consecutive image identification information that indicates relationship of the plurality of stroke information belonging to a first object and the plurality of stroke information belonging to a second object drawn during the one time length, and image identification information that indicates relationship of the plurality of stroke information belonging to the first object, and image identification information that indicates relationship of the plurality of stroke information belonging to the second object; and
includes the consecutive image identification information and the image identification information associated with the position information in the generated consecutive data.

5. The information processing system according to claim 1,
wherein the managing server circuitry further:
numbers consecutive scene identification information that indicates relationship with a plurality of stroke information configuring one scene; and
stores the scene identification information associated with the position information in the generated consecutive data.

6. The information processing system according to claim 1,
wherein the managing server circuitry further distributes the consecutive data stored in the memory to a terminal apparatus having a second display, and
the terminal apparatus plays information drawn on the second display, the second display being a display of a virtual reality display device or a flat display device based on the distributed consecutive data.

7. The information processing system according to claim 1,
wherein the managing server circuitry further provides a snapshot of the information drawn on the display based on the consecutive data.

8. The information processing system according to claim 1,
wherein the managing server circuitry further:
performs character recognition based on the consecutive data; and
generates minutes data including one or more recognized characters.

9. The information processing system according to claim 1, comprising:
one or more managing servers including:
circuitry to:
receive the position information of the first stroke information and the second stroke information drawn on the first display at the different timing;
add the additional information indicating the relationship of the received first stroke information and the received second stroke information to the received first stroke information; and
generate, based on the position information of the received first stroke information, the position information of the received second stroke information and the added additional information, consecutive data used for displaying information drawn on the first display as the first stroke information and the second stroke information, and
a memory to store the generated consecutive data;
a load balancing apparatus configured to distribute operations to one or more managing apparatuses; and
a transferring apparatus configured to
acquire the position information of the stroke information drawn on the first display from the first display; and
transfer the position information of the stroke information being acquired to any one of one or more managing servers via the load balancing apparatus.

10. The information processing system according to claim 1, wherein the additional information includes at least one of scene identification information associated with stroke information that constructs the same scene, consecutive image identification information associated with stroke information belonging to a group of objects drawn within the same range of a period of time, image identification information associated with stroke information belonging to the same object that constructs the group of objects, and order information specifying an order with other stroke information in the object.

11. A method of processing information performed by an information processing system, the method comprising:
   receiving position information of first stroke information and second stroke information drawn on a first display at different timing at a transfer server;
   adding additional information indicating a relationship of the received first stroke information and the received second stroke information to the received first stroke information at a managing server,
   generating, based on the position information of the received first stroke information, the position information of the received second stroke information and the added additional information, consecutive data used for displaying information drawn on the first display as the first stroke information and the second stroke information at the managing server, and
   storing the generated consecutive data in a memory at the managing server;
   receiving the position information and the additional information at a second display based on the consecutive data;
   recreating drawing of strokes that were originally created on the first display on a display screen of the second display and
   displaying the received information on the second display.

12. The method of processing information according to claim 11,
   wherein the first stroke information and the second stroke information respectively indicates a first stroke and a second stroke drawn on the first display, and
   the position information of the first stroke information and the second stroke information includes coordinates information indicating a trajectory of the first stroke and the second stroke on the first display.

13. The method of processing information according to claim 11, the method further comprising:
   setting order information specifying an order of the first stroke information and the second stroke information as the additional information; and
   including the order information in the generated consecutive data by associating the order information with the position information.

14. The method of processing information according to claim 11,
   wherein when a group of objects is drawn during a given one time length, each of the objects is drawn with a plurality of stroke information, and
   the method further comprising:
      setting consecutive image identification information that indicates relationship of the plurality of stroke information belonging to a first object and the plurality of stroke information belonging to a second object drawn during the one time length, and image identification information that indicates relationship of the plurality of stroke information belonging to the first object, and image identification information that indicates relationship of the plurality of stroke information belonging to the second object; and
      including the consecutive image identification information and the image identification information associated with the position information in the generated consecutive data.

15. The method of processing information according to claim 11, the method further comprising:
   numbering consecutive scene identification information that indicates relationship with a plurality of stroke information configuring one scene; and
   storing the scene identification information associated with the position information in the generated consecutive data.

16. The method of processing information according to claim 11, the method further comprising:
   distributing the consecutive data stored in the memory to a terminal apparatus having a second display, and
   playing information drawn on the second display, the second display being a display of a virtual reality display device or a flat display device based on the distributed consecutive data.

17. The method of processing information according to claim 11, the method further comprising:
   providing a snapshot of the information drawn on the display based on the consecutive data.

18. The method of processing information according to claim 11, the method further comprising:
   performing character recognition based on the consecutive data; and
   generating minutes data including one or more recognized characters.

19. The method of processing information according to claim 11, the method further comprising:
   distributing operations to one or more managing apparatuses;
   acquiring the position information of the stroke information drawn on the first display from the first display; and
   transferring the position information of the stroke information being acquired to any one of one or more managing apparatuses.

20. A non-transitory, computer-readable recording medium storing a program that, when executed by one or more processors of an information processing system, causes the processors to implement a method of processing information, comprising:
   receiving position information of first stroke information and second stroke information drawn on a display at different timing;
   adding additional information indicating a relationship of the received first stroke information and the received second stroke information to the received first stroke information;
   generating, based on the position information of the received first stroke information, the position information of the received second stroke information and the added additional information, consecutive data used for displaying information drawn on the display as the first stroke information and the second stroke information;
   storing the generated consecutive data;
   recreating drawing of strokes that were originally created on the first display on a display screen of the second display; and
   displaying the received position information and the additional information.

* * * * *